United States Patent [19]

McKendrick

[11] Patent Number: 4,644,848
[45] Date of Patent: Feb. 24, 1987

[54] ELECTRO-PNEUMATIC PRESSURE REGULATOR FOR TOOLS

[76] Inventor: Lorne J. McKendrick, 365 W. Girard Ave., Madison Heights, Mich. 48071

[21] Appl. No.: 730,332

[22] Filed: May 3, 1985

[51] Int. Cl.$^4$ .............................................. F15B 11/16
[52] U.S. Cl. ......................................... 91/419; 60/420
[58] Field of Search ..................... 91/361, 363 R, 388, 91/433, 419; 137/487.5, 613; 60/420, 459

[56] References Cited

U.S. PATENT DOCUMENTS

| | | | |
|---|---|---|---|
| 3,738,609 | 6/1973 | Divigard | 91/419 X |
| 4,037,519 | 7/1977 | Miller et al. | 91/361 X |
| 4,244,396 | 1/1981 | Friedland et al. | 137/487.5 |

*Primary Examiner*—Stephen F. Husar
*Attorney, Agent, or Firm*—Gifford, Groh, VanOphem, Sheridan, Sprinkle and Dolgorukov

[57] ABSTRACT

An electro-pneumatic pressure regulator control system for precisely adjusting the pressure of fluids applied to a fluid-powered tool such as hydraulic cylinders, pneumatic wrenches and the like includes a current-to-pressure (I/P) transducer, and a fluid conduit coupled in fluid communication between the I/P transducer and the tool including a pressure-to-current (P/I) transducer. In addition, the control system includes an interface which converts an information signal generated in a microprocessor to a current signal of a discrete amplitude for driving the I/P transducer. The interface preferably includes digital, solid state circuitry providing accurate control of the signal being delivered to the I/P transducer. In a preferred form of the present invention, a plurality of sub-control electro-pneumatic regulator systems are selectively activated by a single computerized control. In such a system, the interface of each sub-control system is adapted to receive a disabling command signal while latching the last applied control signal at a particular level. Moreover, in such a system, the P/I transducer can be used to provide a control signal for operating a relay switch used to provide power to a solenoid valve to automatically apply the output pressure to a tool only when a desired output pressure has been generated for introduction into the tool.

24 Claims, 4 Drawing Figures

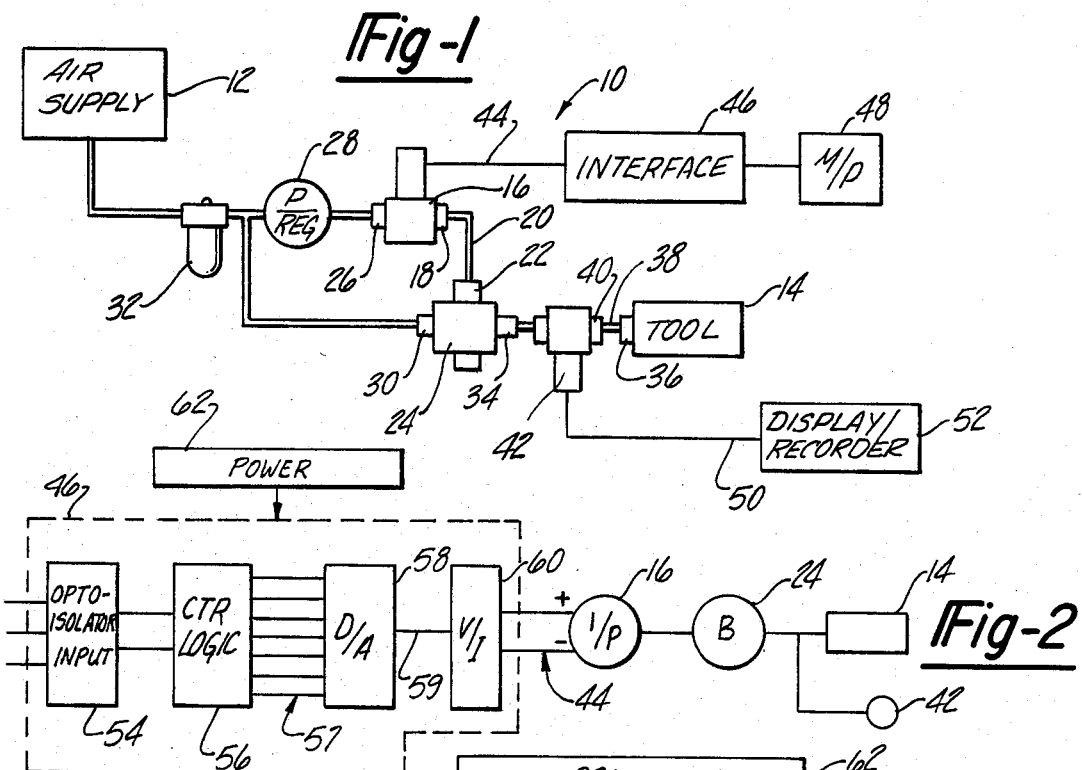
*Fig-1*
*Fig-2*
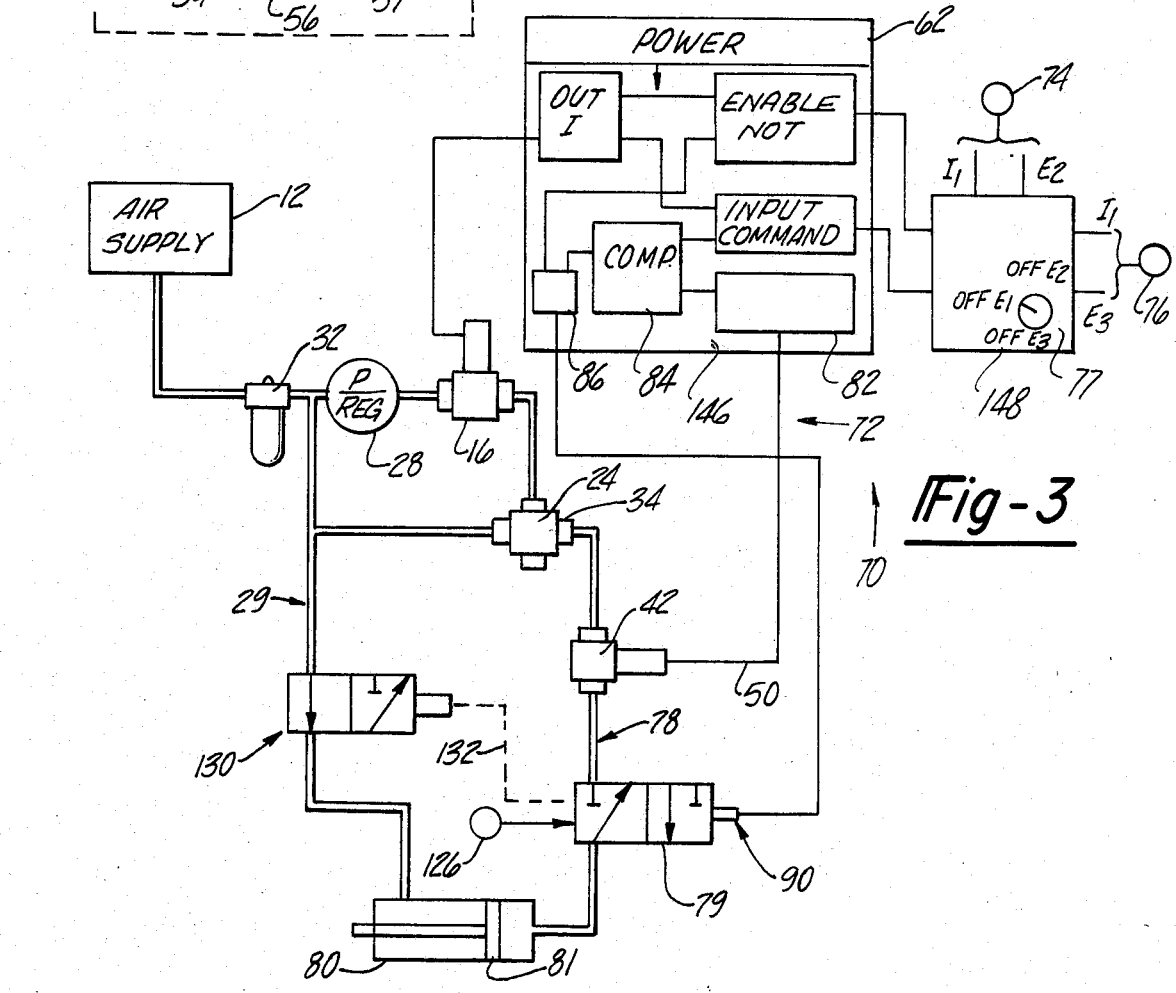
*Fig-3*

ELECTRO-PNEUMATIC PRESSURE REGULATOR FOR TOOLS

BACKGROUND OF THE INVENTION

I. Field of the Present Invention

The present invention relates generally to fluid circuits for regulating the supply of pressurized fluid to a fluid actuated tool, and more particularly to such circuits in which the pressure of the fluid is regulated by controlling an electrical signal delivered to an electro-pneumatic transducer.

II. Description of the Prior Art

Fluid powered tools such as pneumatic wrenches and others utilizing hydraulic cylinders must often be operated at precise fluid pressures in order to perform desired operations. For example, the torque generated by a pneumatic wrench corresponds with the pressure of air delivered to the wrench. Similarly, the force imparted by a hydraulic cylinder directly corresponds with the pressure of fluid supplied to the cylinder. Although manually operated mechanical pressure regulators are well known, they are not well adapted for making repeated adjustments to the pressure applied to a tool which may be necessary during assembly line operations. Moreover, manual adjustment of these regulators can affect the accuracy of the pressure being applied to the tool, especially when repeated adjustments of the pressure are necessary. Moreover such pressure regulators cannot automatically be adjusted and can substantially increase the labor and time necessary to make variations in the pressure applied to hydraulic or pneumatic tools.

Some of the above mentioned disadvantages have been overcome by the use of current to pressure (I/P) transducers which discharge fluid under a pressure corresponding to the value of a current signal applied to the transducer. However, such transducers accurately vary the output pressure only through a limited range, and may therefore be inappropriate for use in industrial applications where broad ranges of repeated pressure variations are necessary.

A system for utilizing electrical control signals for establishing a predetermined output pressure is disclosed in pending U.S. patent application Ser. No. 626,379 of the same inventor. In such a system, the output pressure applied to a welding tool continuously varies as the control signal varies. However, while the change in output pressure occurs relatively quickly, there is some time lag between the time at which the control signal is applied until the time that the tool output is stabilized at the desired value. Thus, the tool may be momentarily operated at an undesirably high or low pressure. Moreover, although the system can be calibrated so that there is precise correspondence between the output pressure and the electrical control signal, the system does not disclose any means for checking the output pressure actually being delivered to the tool or for making a record of the output pressure changes occuring during an operating period. In addition, the system disclosed in that patent application does not teach or suggest an apparatus for regulating the pressure delivered to a plurality of tools from a single computerized control unit such as a microprocessor.

SUMMARY OF THE PRESENT INVENTION

The present invention overcomes the above mentioned disadvantages by providing an electro-pneumatic pressure regulator which includes a feedback sensor for detecting the actual output pressure being applied to the tool. The feedback sensor generates a responsive control signal preferably in the form of a current signal which varies in amplitude as the amplitude of the output pressure varies, whereby the signal can be applied to an indicator, a data recorder or valve switching network as will be discussed in greater detail hereinafter. In addition, the electro-pneumatic pressure regulator includes a circuit means for individually operating a plurality of tools with a single computerized control.

In general, the control system comprises a transducer means for establishing a predetermined output fluid pressure in response to a control signal, fluid passage means for delivering pressurized fluid to a working tool such as a fluid powered cylinder, air wrench or the like, and feedback means for sensing pressure in the fluid passage means and generating a responsive control signal corresponding to the pressure of fluid in the fluid passage means. Although the term fluid is used throughout the disclosure, it is to be understood that the term is not used restrictively and refers to both gas and liquid mediums which can be pressurized. Moreover, in the preferred embodiment of the present invention, the fluid is air which is a substantially lightweight medium and often commonly available in industrial operation facilities.

The basic control system is connected through an interface to a computerized control such as a microprocessor. In one form of the invention, the responsive control signal from the feedback means is analyzed for comparison with the input control signal to determine when the output pressure precisely corresponds with the desired output pressure which has been called for by computerized control. Such comparison is used in the preferred embodiment to control a relay switch which actuates a valve to permit pressurized fluid to be applied to a tool only when the desired output pressure has been reached.

Moreover, the preferred embodiment of the present invention comprises a plurality of sub-control regulators, each sub-control regulator having an interface coupled to a single microprocessor. Each interface includes means for selectively controlling the application of a control signal to the regulator system of a particular tool. In the preferred embodiment, an enable-not command signal from the computerized control is applied to the interface of a sub-control regulator when its respective tool is to be non-responsive to the control signal provided by the computerized control. Conversely, removal of the enable-not command signal from the interface of a particular control system permits adjustment of the output pressure established by the regulator in response to the control signal from the computerized control. As a result, the plurality of sub-control systems can be used to individually operate a corresponding number of respective tools, even though a single control signal is generated by the computerized control at any given time.

Thus the present invention provides an electro-pneumatic control which can prevent the application of output pressures other than a desired, stabilized pressure to a fluid powered tool. Moreover, the control system assures that the output pressure corresponds with a desired output pressure before the output pressure is applied to a tool. In addition, a computerized control means generating a variable control signal can be discriminately applied to one of a plurality of control systems so as to permit individual operation of respective power tools without the need for multiplicity of computerized controls. These and other advantages of such apparatus constructed in accordance with the preferred embodiment of the present invention will be described in greater detail hereinafter.

BRIEF DESCRIPTION OF THE DRAWING

The present invention will be mroe clearly understood by reference to the following detailed description of the preferred embodiment of the present invention when read in conjunction with the accompanying drawing in which like reference characters refer to like parts throughout the views and in which:

FIG. 1 is a diagrammatic view of a pressure regulator control system according to the present invention;

FIG. 2 is a diagrammatic view of a portion of the control system shown in FIG. 1;

FIG. 3 is a diagrammatic view of an electro-pneumatic pressure regulator system according to the present invention showing several modifications thereof.

DETAILED DESCRIPTION OF A PREFERRED EMBODIMENT OF THE PRESENT INVENTION

Figure 4:
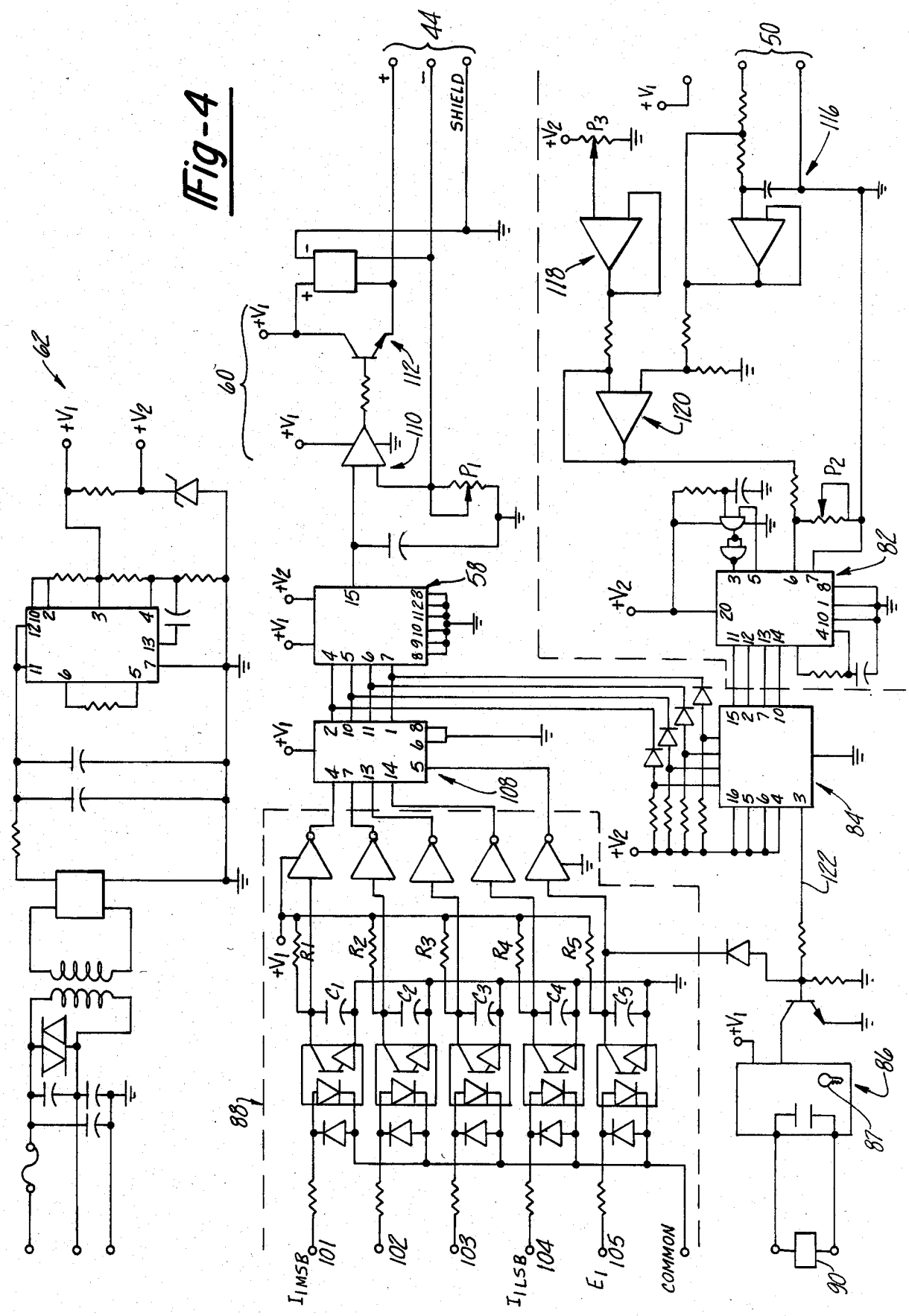
FIG. 4 is a schematic view of a portion of the control system shown in FIG. 3.

Referring first to FIG. 1, an electro-pneumatic pressure control system 10 according to the present invention is thereshown coupling an air supply 12 to a pneumatic tool 14 such as a pneumatic wrench. A current-to-pressure (I/P) transducer 16 such as a Fairchild model 5200 transducer has an outlet 18 fluidly coupled by conduit 20 with the control inlet 22 of a pressure-to-pressure (P/P) booster regulator 24 such as a Belofram type 75 1:6 relay. The inlet 26 of the transducer 16 fluidly communicates with the air supply 25 through appropriate conduit means having a manual pressure regulator 28 for initially reducing the pressure of fluid applied to the inlet of the transducer 16. Upstream of the pressure regulator 28, the inlet 30 of the booster 24 is coupled to the air supply 12. Preferably, pressurized air delivered to the electro-pneumatic control system 10 is filtered by a filter 32 before entering the inlets 26 and 30 of the transducer 16 and booster regulator 24 respectively. The outlet 34 of the booster regulator 24 is coupled to an inlet port 36 of the tool 14 by the fluid passage means 38. The fluid passage means 38 includes an inlet and outlet 40 of a pressure-to-current (P/I) transducer 42.

The transducer 16 is coupled by a conductor 44 to receive a control signal generated in the interface 46 in response to the application of an information signal generated by the computerized control microprocessor 48. While the interaction of the interface 46 and the microprocessor 48 will be described in greater detail hereinafter, it will be understood that the interface 46 provides a current signal to the conductor 44 which controls the output pressure of the fluid delivered from outlet 18 of the transducer 16.

In the preferred embodiment, the amplitude of the current signal delivered through conductor 44 causes the output pressure at outlet 18 to vary in a corresponding relationship. The precisely regulated air pressure at outlet 18 thus forms a pressure control signal which is applied at the inlet 22 of the booster regulator 24 to provide a supply of air to the tool whose pressure is a discrete multiple of the precisely determined pressure in the fluid conduit means 20. In any event, it will be understood that the pressurized air applied to the tool 14 proportionally corresponds to the value of the signal delivered through conductor 44 to the transducer 16.

The pressure to current transducer 42 generates a current signal through a conductor 50 to a display/recorder device 52 so that the pressure of fluid applied to the tool can be visually indicated or recorded during operation of the tool 14. The display/recorder device 52 can be in the form of a conventional printer or other recording media. In the preferred embodiment, a responsive control signal is generated by the transducer 42 and is transmitted by the conductor 50 to the display/recorder 52. The responsive control signal varies in proportion to the pressure of the fluid delivered to the inlet 40 of the pressure-to-current transducer 42.

Referring now to FIG. 2, the interface 46 is disclosed in greater detail and comprises an opto-isolator circuit adapted to receive two types of signals from the microprocessor 48. In particular, in the preferred embodiment, the microprocessor 48 delivers an information signal in the form of an increase command signal or a decrease command signal. In response to receipt of one of these command signals, the opto-isolator circuit generates pulsed signals which are received in a control logic circuit 56. The control logic circuit 56 forms a digital code which can be latched to the digital-to-analog converter 58 as designated at 57. The digital-to-analog converter 58 generates a voltage signal in response to the digital information 57 which is then transformed to a discrete current value by a voltage-to-current converter 60. The interface 46 thus provides a discrete value of current to the current-to-pressure transducer 16 to initiate regulation of the air being delivered from the air supply 12 to the tool 14.

A power supply circuit 62 in the interface 46 provides appropriate power to each of the circuits 54, 56, 58 and 60. While the actual constructions of each of these components of the interface 46 will be better understood by reference to the detailed description of FIG. 4, it will be understood that the control signal delivered through conductor 44 corresponds to an information signal generated in the microprocessor 48. As a result, the control system 10 provides a lower power automatic pressure regulator for a tool 14 so that the tool 14 is promptly and accurately operated as desired. For example, a pneumatic wrench can be operated at a predetermined torque level. Moreover, the pressure applied to the tool 14 can be monitored by means of the pressure-to-current transducer 42 and the display/recorder 52 which form a feedback means for indicating the actual pressure being applied to the tool 14. Of course, monitoring by the feedback means can be relied upon to determine the efficiency of the operation of the electro-pneumatic control system, and as will be discussed in greater detail hereinafter, can be used to assure that the tool operates only under specific working conditions.

Referring now to FIG. 3, an electro-pneumatic control 70 comprises a plurality of sub-control systems 72, 74, and 76 similar to control system 10, but connected for operation by a single microprocessor 148. Each of the sub-control systems 74 and 76 can be substantially the same as the control circuit 72 shown in greater detail in FIG. 3, although it is to be understood that different tools can be operated by sub-control systems 74 and 76 than is operated by the sub-control system 72.

In any event, each of the sub-control systems 72, 74 and 76 is connected by appropriate conductors to receive an information signal I1 generated in the microprocessor 148. In addition, each sub-control unit 72, 74 and 76 also receives an individual deactivating command signal as designated by the reference characters E1, E2 and E3 in FIG. 3. An enable-not command control means 77 selectively switches off the signals E1-E3 to the sub-control circuit 72, 74 and 76.

While sub-control system 72 includes a control logic circuit, a digital to analog converter and voltage to current converter much the same as the control system 10 shown in FIG. 1, the interface 146 includes additional control circuitry. In addition, the tool being operated by the sub-control system 72 in the preferred embodiment of the invention is the pneumatic cylinder 80. Nevertheless, the conductor 44 connects the interface 146 to the pressure transducer 16 and the output of the pressure transducer 16 is applied to an inlet of the booster 24. In addition, the outlet 34 of the booster 24 is coupled with the pressure-to-current (P/I) transducer 42 and through appropriate fluid passage means 78 to the cylinder 80. However, the fluid passage means 78 includes an adjustable valve for controlling the flow of air to the pneumatic cylinder 80. The valve 79 is actuated in response to a ready signal delivered from the ready output circuit 86 in the interface 146 as will be described in greater detail hereinafter.

Moreover, unlike the circuit 10 shown in FIG. 1, the conductor 50 delivering the current signal from the transducer 42 is applied to an analog-to-digital converter 82 in the interface 146 so that the responsive control signal can be compared with the first control signal I1 used to generate the control current applied to the transducer 16. A comparator circuit 84 detects when the responsive control signal corresponds with the first control signal and operates a relay switch to activate the valve 79 which connects the output fluid pressure with the pneumatic cylinder 80 only when the output pressure is stabilized at a desired value.

In addition, enable-not circuitry is used to latch the output pressure at a particular value once the desired input signal has been continuously applied to the input command circuit for a predetermined time. Thus, when the E1 command signal is transmitted to the sub-control system 72, further variations in the information signal I1 do not affect the operation of the sub-control circuit 72. Moreover, application of the E1 command signal overrides the control of the relay provided by comparator circuit 84.

Details of the interface means 146 can be best described with reference to FIG. 4. The power supply circuit 62 converts an alternating current signal, such as a conventional 115 volt AC industrial current to DC voltage signals V1 and V2. In the preferred embodiment, an LM 723 precision voltage regulator is utilized to provide a V1 of approximately 15 volts DC and V2 of approximately 6.1 volts DC despite variations in the input line AC voltage within the range of +10 to −20%. Each voltage V1 and V2 is applied as indicated throughout the remaining portions of the interface means as designated by the reference characters V1 and V2 throughout FIG. 4.

The input command circuit 88 receives the information signal I1, and as shown in FIG. 4, in the form of four 115 volt AC input signals representing bits of a coded information signal the input command circuit then generates 15 volt DC digital input command signals. A 4N37 Opto-isolator converts each halfwave rectified 115 volt AC input signal to a pulsating switch signal which momentarily shorts its respective capacitor C1–C4 to ground. When the capacitor charges through its respective resistor R1–R4, the output of the inverter goes high. If a 115 volt AC signal is removed from one of the four bit terminals 101-104, the output of the Schmidt-trigger input inverters goes low. In any event, the digital input command signal is delivered to an output current circuit to be transformed into a regulated DC signal to be applied to the transducer 16.

The output current circuit comprises a 4042 four bit latch 108 which stabilizes the digital input command signal when no signal E1 is applied to the terminal 105, and latches the four bit input word to the output line 57 when a signal E1 is applied to the terminal 105. A digital-to-analog converter 58 in the form of an AD 7523 eight bit digital/analog converter receives the input word and translates it to a DC voltage. In the preferred embodiment, the output voltage of the AD7523 varies between 0.0 and 5.3 volts DC in 0.35 volt increments. The voltage is then transformed to a regulated current output by the voltage-to-current converter 60 formed by an op-amp 110 and a transistor 112. The potentiometer P1 is used to adjust the output current to a predetermined maximum current output when the maximum input binary code i.e. 1111, is delivered to the 4042 four bit latch 108. Of course, the output of the voltage-to-current converter 60 is then applied to the conductor 44 to operate the pressure transducer 16.

As also shown in FIG. 4, the interface 146 also includes a feedback means comprising an input circuit 114 having an analog-to-digital converter 82, as well as a comparator 84 and a ready output circuit 86. The input circuit 114 receives a signal from pressure-to-current transducer 42 through conductor 50 and includes a low pass filter 116 which removes any high frequency noise. While the pressure transducer 42 of the preferred embodiment produces a DC signal within a 10 volt DC span over a 100 psi pressure range, the transducer has a voltage offset of approximately 2.5 volts DC. As a result, the filtered signal provided by the filter 116 is summed with the output of the zeroing circuit 118 by a differential amplifier 120 to compensate for the offset signal. The trimming potentiometer P3 and zeroing circuit 118 are adjusted to produce an output voltage of 0.0 volt DC from the differential amplifier 120 when the pressure to transducer 42 senses a 0 psi output pressure. The output from the differential amplifier 120 is then adjusted for amplitude by a multiple corresponding to the multiplication factor of the booster 24 before being converted to a digital word in the analog-to-digital converter 82. The trimming potentiometer P2 is adjusted to produce a binary coded output of value 248 in the analog-to-digital converter 82 when the pressure transducer 42 senses an output pressure of 90 psi, after the trimming potentiometer P3 has been set as indicated above. In the preferred embodiment, the low pass filter 116, the zeroing circuit 118 and the differential amplifier 120 are conveniently formed by op-amps, and the analog-to-digital converter is advantageously provided an integrated circuit such as an ADC 0804.

The four bit output signal from the analog-to-digital converter 82 is applied to a digital compare circuit 84. The compare circuit 84, which in the preferred embodiment comprises an NC 14585 integrated circuit, compares the four bit input information signal with the most significant four bits of the signal from the converter 82.

When the two signals are equal to one another, the output of the comparator 84 at 122 is raised to a high level which actuates the output ready circuit 86.

In the preferred embodiment, the output ready circuit 86 is a solid state 115 volt AC relay. As a result, the input power signal is applied through a solenoid switch 90 in order to position the valve 79 so that the fluid passage means 78 fluidly communicates the output pressure from the regulator to the tool 80. Nevertheless, the solid state relay can be disabled when the command signal E1 is applied to the enable-not terminal 105 through diode connection 124 shown in FIG. 4.

Application of the command signal E1 to the terminal 105 also causes the latch 108 to latch the four bit word output signal with the digital-to-analog converter 58. Of course, application of the signal E1 to the terminal 105 must be delayed for a time $T = R(x) C(x)$ during which the signals applied to the terminals 101 through 104 have remained constant in order to assure that the output applied to the conductor 44 is at the desired current level.

Referring again to FIG. 3, and in view of the fact that the output ready circuit 86 can be disabled when the enable-not command signal E1 is applied to terminal 105, it will be recognized that disabling of the relay 86 can result in deactivation of the solenoid valve 90. If the tool 80 is to be operated longer than the time necessary to set the output of the interface 146, and the information signal E1 is to be applied to another sub-control circuit 74 or 76, a separate means 126 for retracting the valve 79 can be used in lieu of returning the valve 79 to its off position. As a result, output pressure can be supplied to the tool 80 while the interface of the circuit 72 has been deactivated by application of the enable-not signal E1 to terminal 105, whereby, the relay 86 is disabled. Accordingly, the microprocessor 148 can be used to control another sub-control circuit 74 or 76 while the tool 80 remains operative. Moreover, in the case of the pneumatic cylinder 80 shown in FIG. 3, the retraction side of the piston 81 can be directly coupled to the high pressure line 29 through a valve 130 when the valve 79 disconnects the regulated output pressure from the other side of the piston 81. Sliding of the valves 130 and 79 can be accomplished simultaneously by a well known connection means designated diagrammatically at 132.

Having thus described the important structural features of the preferred embodiment of the present invention, it will be understood that the present invention provides an electro-pneumatic control system in which the application of varied output pressures to a fluid powered tool can be monitored to determine when a desired output pressure value is being attained at the tool. Moreover, the feedback signal used to indicate the pressure can be used to couple the fluid to the power tool only when the desired output pressure has been attained. Moreover, the output pressure will continually track the input information data unless an enable-not signal is delivered from the computerized control. Nevertheless, the output pressure will remain latched even though input data may be changing, since the information signal affects only those sub-control electro-pneumatic systems which receive only the information signal. As a result, the computerized control can be shared by multiple sub-control circuits although each sub-control circuit is individually actuated as desired.

Having thus described my invention, many modifications thereto will become apparent to those skilled in the art to which it pertains without departing from the scope and spirit of the present invention as defined in the appended claims.

What is claimed is:

1. A control system for coupling and regulating the flow of fluid from a supply of pressurized fluid to at least one fluid powered tool in response to at least one, electrical, first control signal said control system comprising:
    transducer means for establishing a first predetermined output fluid pressure which is continuously variable in proportion to said first control signal,
    fluid passage means for coupling said transducer means to said at least one tool,
    and feedback means for sensing the pressure in said fluid passage means and generating a responsive control signal corresponding to the pressure of fluid in said fluid passage means.

2. The invention as defined in claim 1 wherein a computerized data processor generates an information signal and wherein said control system further comprises interface means for transforming said information signal to a control signal having a discrete current value, and wherein said transducer means varies said first predetermined output pressure in proportional correspondence with changes in said current value.

3. The invention as defined in claim 2 wherein said interface means comprises input circuit means for digitally representing said information signal and,
    output circuit means for converting the digital representation to a discrete current signal.

4. The invention as defined in claim 3 wherein said output circuit comprises control logic circuit means for buffering the digital representation, a digital-to-analog converter circuit means for converting the digital representation to a representative voltage signal, and a voltage-to-current converter circuit means for converting said representative voltage signal to a discrete current signal.

5. The invention as defined in claim 4 wherein said control logic circuit means comprises latching means for latching the digital representation to said digital-to-analog converter means when said informational signal has been continuously applied for a predetermined time.

6. The invention as defined in claim 1 wherein said transducer means comprises a low pressure current-to-pressure transducer having means for establishing an intermediate output pressure and a pressure-to-pressure transducer for establishing said first output fluid pressure in response to said intermediate output pressure.

7. The invention as defined in claim 2 wherein said at least one tool comprises at least two tools, wherein said control system comprises a sub-control system for each tool, each sub-control system having a transducer means for establishing a first predetermined output fluid pressure which is continuously variable in proportion to said first control signal,
    fluid passage means for coupling said transducer means to one of said at least two tools,
    and feedback means for sensing the pressure in said fluid passage means and generating a responsive control signal corresponding to the pressure of fluid in said fluid passage means.

8. The invention as defined in claim 7 and further comprising means for selectively actuating each sub-control system.

9. The invention as defined in claim 8 wherein said microprocessor generates a command signal and includes means for selectively conducting said command signal to each of said interface means, and wherein each said interface means comprises means for disabling said means for adjusting said first predetermined output pressure in response to said command signal.

10. The invention as defined in claim 9 wherein each of said interface means comprises means for latching said first predetermined output pressure at a discrete value when said control signal has remained constant for a predetermined period of time.

11. The invention as defined in claim 10 wherein each fluid passage means comprises valve means for selectively coupling said first output pressure to said tool and means for actuating said valve to an open position in which said fluid passage means fluidly communicates with its respective tool when said responsive control signal is equal to said first control signal, and further comprising means for returning said valve to a closed position in response to said command signal.

12. A control system for coupling and regulating a supply of pressurized fluid to a plurality of fluid-powered tools comprising:
 a microprocessor adapted to generate an information signal and a command signal, and
 a plurality of sub-control systems corresponding in number to the number of tools to be controlled, and each having an interfacing means,
 wherein said microprocessor includes means for selectively coupling said command signal to each interfacing means, and
 wherein each sub-control system comprises:
 interfacing means for converting said information signal to a control current signal when said command signal is shut off from said interfacing means,
 a transducer means for establishing a first predetermined output fluid pressure corresponding to said control signal,
 fluid passage means for coupling said transducer means to its respective tool, and
 means for coupling said information signal to each interfacing means.

13. The invention as defined in claim 12 and further comprising feedback means for sensing the pressure in said fluid passage means and generating a responsive control signal corresponding to the pressure of fluid in said fluid passage means.

14. The invention as defined in claim 13 and further comprising valve means in said fluid passage means for selectively coupling said fluid passage means in fluid communication with its respective tool.

15. The invention as defined in claim 14 wherein said interfacing means includes means for comparing said control signal with said responsive control signal and means for actuating said valve means when said responsive control signal corresponds with said control signal.

16. A control system for coupling and regulating the flow of fluid from a supply of pressurized fluid to at least one fluid powered tool in response to at least one, electrical, first control signal, said control system comprising:
 a computerized data processor which generates an information signal;
 an interface means for transforming said information signal to a control signal having a discrete current value, said interface means comprising input circuit means for digitally representing said information signal and output circuit means for converting the digital representation to a discrete current signal;
 transducer means for establishing a first predetermined output fluid pressure corresponding to said control signal, wherein said transducer means varies said first predetermined output pressure in proportion to changes in said current value;
 fluid passage means for coupling said transducer means to said at least one tool;
 and feedback means for sensing the pressure in said fluid passage means and generating a responsive control signal corresponding to the pressure of fluid in said fluid passage means;
 wherein said output circuit comprises control logic circuit means for buffering the digital representation, a digital-to-analog converter circuit means for converting the digital representation to a representative voltage signal, and a voltage-to-current converter circuit means for converting said representative voltage signal to a discrete current signal.

17. The invention as defined in claim 16 and further comprising display means for indicating a representation of said output fluid pressure.

18. The invention as defined in claim 17 wherein said display means comprises means for recording the representation.

19. The invention as defined in claim 16 wherein said interface includes comparator means for comparing said responsive control signal with said first control signal.

20. The invention as defined in claim 19 and further comprising valve means in said fluid passage means for selectively coupling said first output pressure to said tool, and means for actuating said valve to a position in which said fluid passage means fluidly communicates with said tool when said responsive control signal is equal to said first control signal.

21. The invention as defined in claim 16 wherein said control logic circuit means comprises latching means for latching the digital representation to said digital-to-analog converter means when said informational signal has been continuously applied for a predetermined time.

22. A control system for coupling and regulating the flow of fluid from a supply of pressurized fluid to at least one fluid powered tool in response to at least one, electrical, first control signal, said control system comprising:
 transducer means for establishing a first predetermined output fluid pressure corresponding to said control signal;
 fluid passage means for coupling said transducer means to said at least one tool;
 and feedback means for sensing the pressure in said fluid passage means and generating a responsive control signal corresponding to the pressure of fluid in said fluid passage means,
 wherein said transducer means comprises a low pressure current-to-pressure transducer having means for establishing an intermediate output pressure and a pressure-to-pressure transducer for establishing said first output fluid pressure in response to said intermediate output pressure.

23. A control system for coupling and regulating the flow of fluid from a supply of pressurized fluid to at least one fluid powered tool in response to at least one, electrical, first control signal, said control system comprising:
 a computerized data processor which generates an information signal; and wherein said at least one tool comprises at least two tools, said control system comprises a sub-control system for each tool, each sub-control system comprising:

an interface means for transforming said information signal to a control signal having a discrete current value;

transducer means for establishing a first predetermined output fluid pressure corresponding to said first control signal, wherein said transducer means varies said first predetermined output pressure in proportion to changes in said current value;

fluid passage means for coupling said transducer means to said at least one tool;

and feedback means for sensing the pressure in said fluid passage means and generating a responsive control signal corresponding to the pressure of fluid in said fluid passage means.

24. The invention as defined in claim 23 wherein a microprocessor generates an information signal and wherein each sub-control system further comprises interface means for transforming said information signal to a discrete signal having a discrete current value, and wherein said each said transducer means comprises means for adjusting said first predetermined output pressure in proportional correspondence with variations in said current value, and means for conducting said information signal to each said interface means.

* * * * *